S. T. HOLLY.
Grain Binder.

No. 57,138.

3 Sheets—Sheet 1.

Patented Aug. 14, 1866.

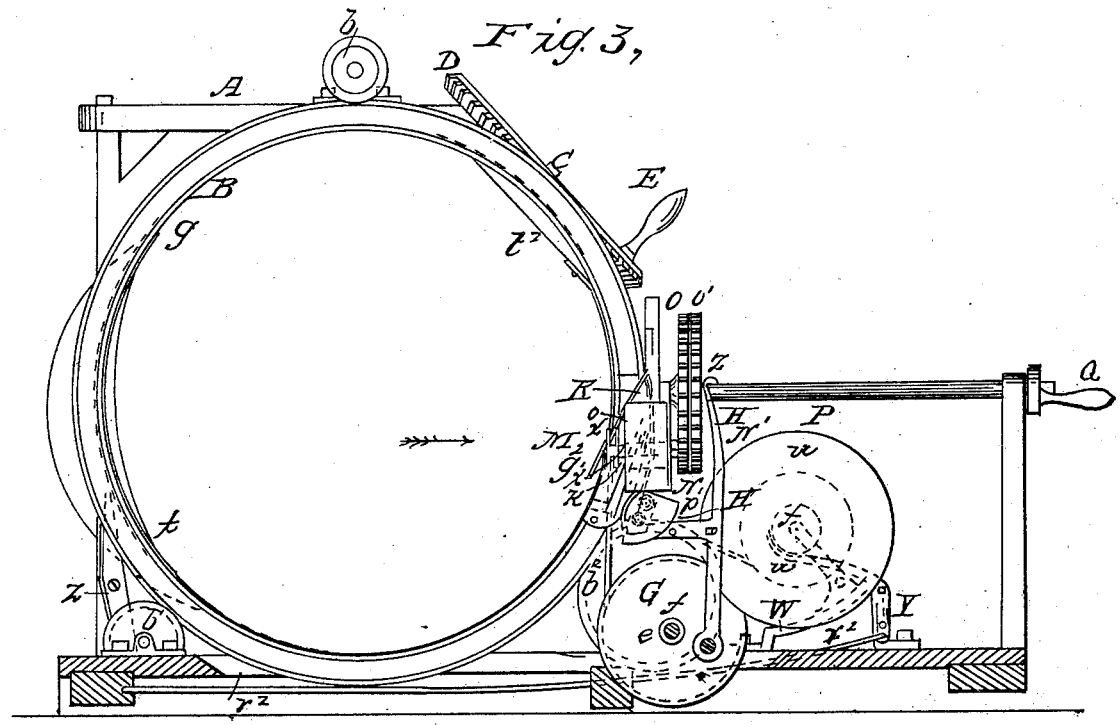
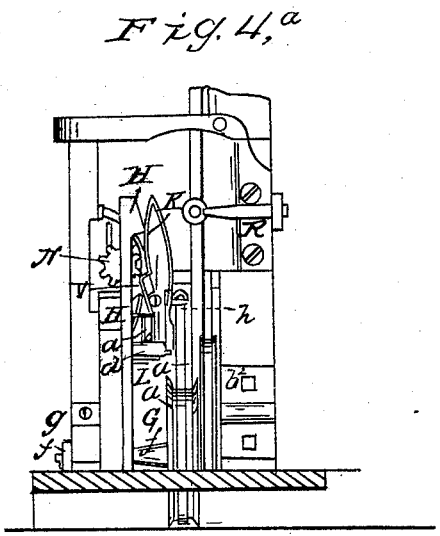
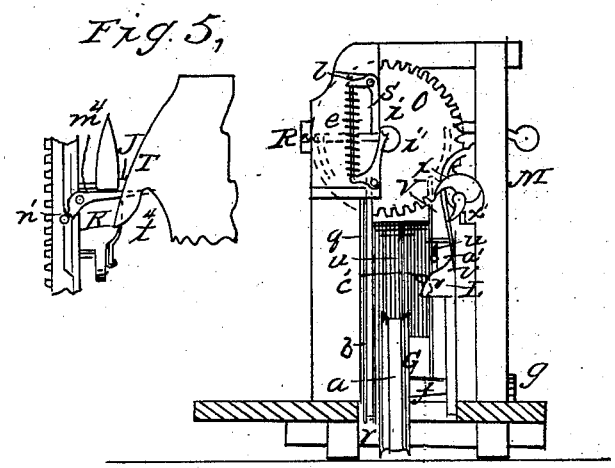

S. T. HOLLY.
Grain Binder.
3 Sheets—Sheet 3.
No. 57,138. Patented Aug. 14, 1866.
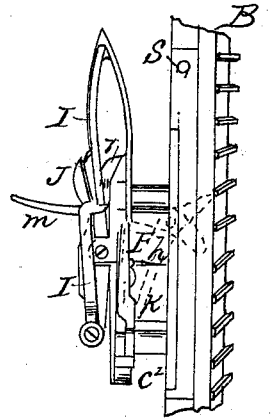
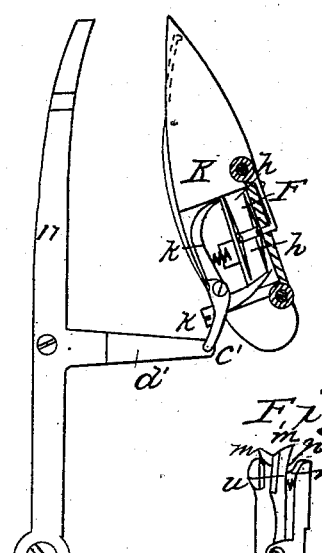
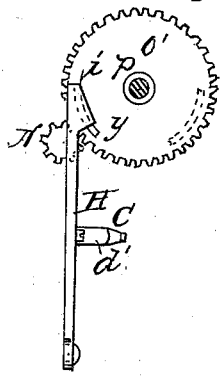
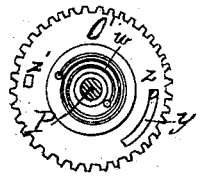
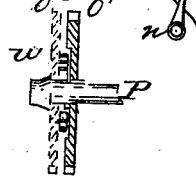
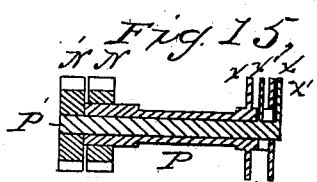

UNITED STATES PATENT OFFICE.

SOLOMON T. HOLLY, OF ROCKFORD, ILLINOIS.

IMPROVEMENT IN GRAIN-BINDERS.

Specification forming part of Letters Patent No. 57,138, dated August 14, 1866.

*To all whom it may concern:*

Be it known that I, SOLOMON T. HOLLY, of Rockford, in the county of Winnebago and State of Illinois, have invented certain new and useful Improvements in Mechanism for Binding Grain and other articles to which it may be applicable; and that the following is a full, clear, and exact description of the same, reference being had to the accompanying drawings, in which—

Figure 1:
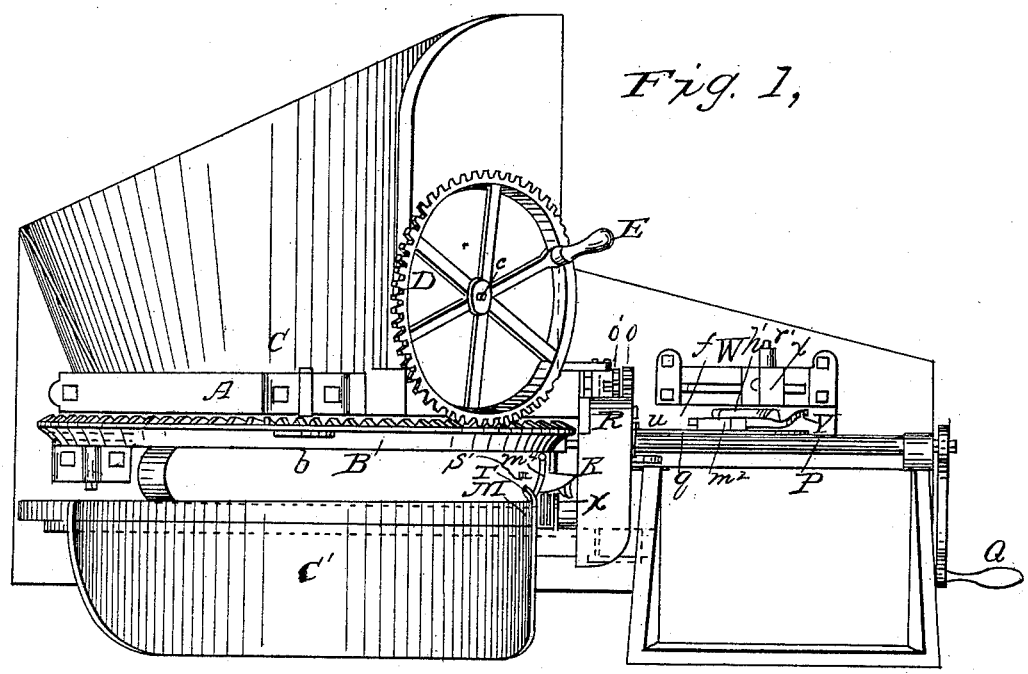
Figure 16:
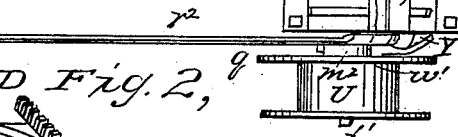
Figure 2:
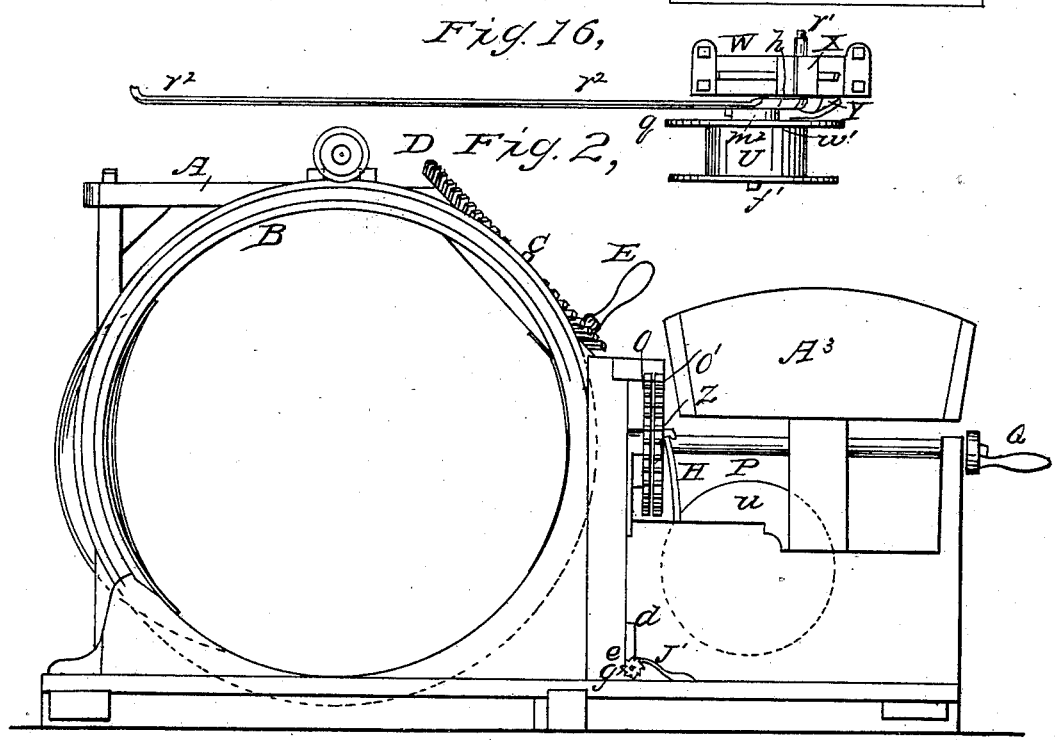

Figure 1 represents a plan of a binding apparatus constructed according to my invention, and suitable for being applied to a harvester. Fig. 2 represents a rear elevation of the same. Fig. 3 represents a rear elevation of the same, with portions removed to enable the remainder to be seen. Fig. 4 represents an elevation of the band-securing devices and other members, looking in the direction of the arrow in Fig. 3; and Fig. 4ª represents the same looking toward the point of the said arrow, certain portions of the machine being removed to enable the remainder to be more clearly seen. Fig. 5 represents a corresponding elevation of the traveling finger-stock and other parts. Figs. 6, 7, and 8 represent views of the finger-stock and its appurtenances, drawn upon a larger scale than the preceding drawings; and Figs. 9 to 16, inclusive, represent detached parts of the apparatus, denoted by the same letters as are applied to them in the other figures.

The operation of the apparatus which I am about to describe is as follows: The gavel of grain is compressed by means of a flexible compressing-strap carried round it by a ring-carrier, and at the same time is surrounded with binding-wire, one end of which is carried by a pair of fingers or forceps mounted upon the ring-carrier. As the ring-carrier completes its revolution around the gavel, the band surrounding the gavel is severed from the remainder by a pair of shears, which form part of the forceps that carries the end of the binding-wire, and the two ends of the band are delivered to a twister with spring-jaws that close upon the wire. The ends of the wire band are then twisted together, and when the twisting is completed the twister relaxes its hold upon them. Lastly, the flexible compressing-strap is withdrawn from the bound sheaf, and the latter is released.

My present invention consists of a number of improvements constituting its parts, and the first of these has reference to the compressing-strap, its object being to enable the tension of this strap to be adjusted. This part of my invention consists of the combination of the spring-drum and arbor of the compressing-strap with a ratchet-wheel and pawl, or their equivalent, so that the spring may be wound more or less tightly, and may be secured in any desired condition without the necessity of opening the drum.

The second part of my invention has reference to the cutting of the band, extended around the gavel, from the mass of binding material extending to and wound upon the spool; and it consists of the combination of the ring-carrier with shear-blades for effecting the cutting, so that the cutting is effected by instrumentalities which are carried around the gavel.

The third part of my invention has reference to the fingers for carrying the binding material around the gavel of grain; and consists of the combination of the traveling fingers or jaws for griping the end of the binding material with shear-blades, so that the binding material is cut, and the new end formed by cutting is griped by the same closing movement of the fingers.

The fourth part of the invention has reference to the means for insuring the seizure of the binding material (proceeding from the gavel to the reel) by the traveling fingers or forceps that carry the band around the gavel; and it consists of the combination of the traveling forceps and the instrument that carries them around the gavel, with a stationary notched shield-plate or projection in the track of the binding material proceeding from the gavel to the reel, which stationary shield or projection prevents the material from rising as high as the point at which the traveling forceps stop when the gavel is surrounded with the binding material.

The fifth part of the invention has reference to the means for opening and closing the traveling fingers or forceps that carry the end of the band around the gavel; and it consists of the combination of the traveling forceps with a stationary inclined block, arranged within the range of motion of the shank of the forceps or some instrument which acts upon it, so that the forceps is opened during its movement by a stationary instrument.

The object of the sixth part of the invention is to prevent the binding material from dragging longitudinally from between the jaws of the traveling forceps or fingers, and consists of the combination of these jaws with a heel which extends transversely across the opening between the jaws.

The seventh part of the invention consists of the combination of the jaws or fingers of the traveling forceps with a guard which prevents the binding material from passing down into the hinge which connects the jaws.

The eighth part of the invention consists of a twister for twisting the ends of the band together, composed of two jaws extending in radial directions from two shafts which are concentric or thereabout, so that the jaws are made to approach each other by turning one of the shafts relatively to the other, and they are then made to twist the ends of the binding material together by turning both shafts simultaneously.

The ninth part of the invention has reference also to the twister, and consists in constructing the jaws of the twister with hooked faces, so that they gather in the binding material toward the center, upon which they rotate as they close upon it.

The tenth part of the invention has reference to the means for operating the jaws of the twister, and consists of the combination of both of them with one driving-shaft, by means of pinions and two cog-wheels, one of which last is connected with the other or with the driving-shaft by a spring, so that the closing and opening of the jaws are effected by the movement of one cog-wheel relatively to the other and to the shaft, while the twisting of the binding material is effected by the simultaneous movement of both cog-wheels by the driving-shaft.

The object of the eleventh part of the invention is to compel the band to enter the instrument for securing the band and to be extended transversely to it. This part of my invention consists of the combination of the traveling forceps, or other instrument for carrying the band around the gavel, with a movable driver which projects crosswise to the length of the band, so as to bear the band before it at the time the traveling forceps is completing its revolution.

The twelfth part of the invention consists of the combination of the driver, specified in the last preceding paragraph, with a ring-carrier for carrying it round the gavel.

The object of the thirteenth part of the invention is to cause the extremities of the band around the gavel to close together, so that they may enter the twister or other band-securing instrument simultaneously or thereabout. This part of my invention consists of the combination of a traveling forceps (for carrying the band around the gavel) with a movable driver, (to bear the band before it,) and with a directing instrument (which I prefer to have the form of a shield-plate) to guide the extremities of the band together as they are pushed forward by the driver when the forceps is completing its movement.

The object of the fourteenth part of my invention is to take up the slack of the binding material formed in the operation of binding; and consists of the combination of the spool or reel of the binding material with the ring-carrier by frictional contact, (either applied directly or through the intervention of another wheel,) so that the spool is turned to wind up the slack by the movement of the ring-carrier.

The object of the fifteenth part of the invention is to permit the pressure of the spool against the wheel that is in frictional contact with it to be adjusted without materially changing the position of the spool; and it consists of the combination of the swinging-arm which holds the spool-arbor with a movable bearing, and with a curved chair for said bearing.

The object of the sixteenth part of my invention is to relax the tension produced upon the binding material by frictional contact derived from the ring-carrier during the drawing of the material from the spool; and it consists of the combination of the ring-carrier and spool with mechanism to move the spool slightly from the wheel that is in frictional contact with it during the drawing off of the binding material.

The object of the seventeenth part of my invention is to prevent the spool from running off binding material by momentum after the drawing off of material for the purpose of binding has ceased; and it consists of the arrangement of the spool and the mechanism for relieving its pressure upon the instrument that resists its turning by friction, in such manner that the turning of the spool (when the pressure is relieved) is still sufficiently resisted to neutralize its momentum.

The object of the eighteenth part of my invention is to cause the binding material to deliver freely from the spool or reel on which it is wound; and it consists of the arrangement of the guide through which the material passes from the spool in such manner relatively to the spool that the strain of drawing off the material tends to move the spool from the friction mechanism that retards its turning, the practical effect of which arrangement is to cause the spool to deliver the material smoothly, without jerking or jumping.

The binding apparatus represented in the accompanying drawings is adapted to binding grain delivered to it from the raking-platform of a harvester, and embodies all my improvements. The cradle of this apparatus in which the grain to be bound is received is formed of wood lined with sheet-iron, and has a flaring or funnel-formed mouth, so that the gavel of grain shoved into it by a fork is partially compressed and caused to enter through the circular frame A, which sustains the ring-carrier B, which in this example carries the compressing-strap $a$ and the binding-cord around the gavel. The ring-carrier B is held in place and guided in moving by wheels $b$ $b^1$ $b^2$, whose grooved rims embrace the rim of the ring-carrier. Its interior is larger in diameter than the interior of the circular frame A of the cradle, so that the grain will pass freely through it, and be supported clear of the carrier by the two parts C and C' of the cradle, between which the ring-carrier is arranged to turn. The ring-carrier has a series of cog-teeth upon one of its faces, which engage with the corresponding teeth of a cog-wheel, D, that is arranged to turn upon a stud, $c$, and is fitted with a crank-handle, E, so that by turning this cog-wheel D, the ring-carrier is caused to revolve in its wheel-supports.

The ring-carrier has a strap-holder, F, upon it to seize and carry the compressing-strap around the gavel of grain. The compressing-strap $a$ is made of leather, so as to be flexible and strong, and is coiled upon a drum, G, within which there is a spring that is similar in construction and operation to a clock-spring, and is of sufficient strength to effect the compression of the grain. The spring-drum thus forms a tension apparatus for the compressing-strap, the drawing off of the compressing-strap is resisted by the spring, and the strap is always under tension as it is drawn around the gavel by the movement of the ring-carrier. The inner end of the coiled spring is secured to an arbor, $e$, that projects from a bearing, $d$, secured to the frame of the machine in the vicinity of the band-securing devices, and enters the interior of the strap-drum G through a tubular hub, $f$, secured to one of its heads, so that the drum turns upon this arbor. The arbor is not fixed in its bearing $d$, but is fitted to turn in it, and it is provided with a ratchet-wheel, $g$, whose teeth engage with a pawl, $j$, so that the arbor may be turned to wind up the spring and adjust the tension of the strap, the pawl holding the arbor in the position in which it is placed by such adjustment. The end of the strap to be carried around the grain is held by the detachable strap-holder F, secured to the ring-carrier. This strap-holder is a four-armed instrument, which revolves upon a pivot secured to the ring-carrier. Each of its arms, $h$, has a slot in it of sufficient size to admit the body of the compressing-strap $a$, but too small to permit the passage of the end of the strap, which is formed into a head by doubling it. The ends of the arms revolve within the range of a spring-detent, $k$, which is moved by means of a lever, H, that is operated by the band-securing mechanism, as will be hereinafter described, so that the detent is moved to permit the detachable strap-holder to turn and release the compressing-strap when the band is secured. The operation of the compressing-strap is the same as is described in my previous patent, dated the 26th day of January, 1864, No. 41,378.

In order that the revolution of the ring-carrier may be stopped at the proper point when the gavel is surrounded and compressed by the compressing-strap, a locking mechanism is provided, consisting of a pair of latch-stops, $i$ $i'$, which are secured to the frame of the cradle in a proper position to act upon a pin, $s$, which projects radially from the ring-carrier B. Each of these latch-stops consists of an elbow-formed latch turning on a pivot at its elbow, and having its head notched to receive the pin of the ring-carrier. The heads of the stops point in opposite directions, so that the upper one when protruded from the case in which it is pivoted prevents the forward movement of the ring-carrier, and the lower, when similarly protruded, prevents it from being turned backward. The horizontal arm of the upper latch-stop has a rod, $l$, pivoted to it, whose lower end is formed into a tenon, which enters a slot in the horizontal arm of the lower stop, in such manner that the horizontal arm of the lower stop bears against the shoulders of this rod; hence when the head of the lower step is pushed into the stop-case, that of the other is of necessity protruded from the case. A spring is provided to protrude the head of the lower stop $i'$ from the stop-case, and another to withdraw the upper stop into the case. When the ring-carrier is being turned to encircle the gavel with cord and with the compressing-strap, the latch-stops occupy the positions they are represented in at Fig. 4, so that the pin of the ring-carrier as it turns upward bears against the lower stop, pushes it inward, and causes the head of the upper to protrude, (by reason of the rod $l$ between the horizontal arms of the two latch-stops,) so that it stops the further forward movement of the ring-carrier; and as soon as the pin of the ring-carrier passes by the lower stop and enters the notched head of the upper one, the head of the lower is protruded by its spring beneath the pin, so that it is in position to stop the retrograde movement of the ring-carrier (caused by the strain upon the compressing-strap when the force applied to turn the ring-carrier forward is withdrawn) as soon as it has retrograded the small distance required to move the pin $s$ into the notch in the lower slot. As this notch is deep enough to receive the pin $s$, the movement of that pin into it releases the upper latch, which is then withdrawn into the casing by the action of its spring. The ring-carrier then is permitted to remain at rest until the band is secured, and the sheaf is removed and a new gavel of grain is placed in the cradle, when it is again caused to revolve.

In order that the wire band may be carried around the gavel of grain, the ring-carrier B is provided with a forceps, J, whose jaws are fluted, so as to gripe the wire firmly. The said jaws thus perform the function of the traveling fingers or forceps described in my aforesaid previous patent, but are operated in a different manner, one of the jaws, $m$, being fixed, to the finger-stock K, which is mounted upon the ring-carrier, while the other jaw, $m$, is formed upon the end of a lever which is pivoted to the finger-stock K, is pressed toward the fixed jaw by a spring, $r$, and is fitted at its shank with a friction-roller, $n$. The sides of the jaws which are next the gavel of grain are formed into shear-blades $t\,t$, for the purpose of severing the band around the gavel from the remainder of the wire, and as the jaws are mounted upon the ring-carrier, these shear-blades are also combined with it, and are carried around the gavel by it. The binding-wire is fed to the said traveling fingers or forceps between a pair of sheaves, $a'\,a'$, secured to the frame of the machine below the point at which the forceps start when commencing their movement, and to which they are returned by the revolution of the ring-carrier; hence the effect of the revolution is to cause the band to encircle the forceps as well as the grain, so that the wire leading from the grain to the sheaves tends to enter between the jaws of the forceps a little before the revolution is completed.

In order that the binding material proceeding from the gavel to the sheaves may not escape the jaws of the forceps, a stationary shield-plate, T, is secured to the frame of the apparatus with a tongue, $t^4$, projecting out into the space traversed by the binding material as it is carried by the traveling forceps, so that a reversed notch is formed to receive the binding material extending from the upper side of the gavel, and to prevent it from rising as high as the point to which the traveling forceps are returned. While the binding material is being drawn round the gavel it extends transversely across the rim of this shield-plate, and as the operation proceeds the binding material slips downward to the point of the tongue $t^4$ and passes within the notch. Then, as the gavel is compressed tightly (by the compressing-strap) against the shield-plate T, the fork of the notch prevents the binding material near the gavel from rising as high as the point to which the forceps are returned for a new start; hence the binding material or wire is caused to extend from the notch of the shield-plate to the sheaves $a'\,a'$, in a line approximately radial to the ring-carrier and across the track pursued by the jaws of the traveling forceps, so that it cannot escape them. In order that the jaws of the forceps may be open to receive the wire, and that they may be operated to cut the band from the remainder of the wire, a double-inclined block, L, is secured within the range of motion of the friction-wheel $n$ upon the shank of the movable jaw of the forceps, so that one of the inclines $v$ of said block shall act upon said roller and effect the opening of the jaws to admit the wire leading from the grain to the sheaves $a'\,a'$, and the other of said inclines $v$ shall then force the movable jaw toward the fixed one, thereby causing the shear-blades to sever the wire and the fluted faces of the jaws to close upon and gripe the new end thus formed, so that it may be carried around the next succeeding gavel of grain. As the jaws are fluted, and the projections of one jaw fit into the grooves of the other, they begin to crimp the wire as they close, so that the wire leading to the spool is prevented from escaping during the cutting, although the jaws have not been completely closed. In order that the end of the wire griped by the jaws may be prevented from withdrawing longitudinally from the fluted faces, a heel, $u$, is formed upon one of them, so as to extend transversely across the opening between the jaws and prevent such movement by barring the passage of the wire; and in order that the wire when it enters may not pass down into the hinge of the forceps previous to being cut, a hinged guard, I, is provided with a shoulder, $o$, extending across the opening between the jaws. The upper end of this guard extends to the point of the finger-stock I and directs the wire band into the jaws.

The band-securing devices are situated below the point at which the traveling forceps or fingers stop when the grain is encircled with the wire band, and above the opening between the sheaves $a'\,a'$, so that the two ends of the band around the grain may both be delivered to the cord-twister M. This cord-twister has a pair of jaws, one of which, $x$, is secured to a tubular shaft, $p$, in a direction radial, or thereabout, thereto, while the other, $x'$, is secured to a solid shaft, $p'$, which extends through the tubular shaft $p$ and is concentric therewith, the jaw being in a direction radial, or thereabout, to the shaft, so that, by turning the solid shaft relatively to the tubular shaft, the two jaws are made to approach each other and gripe the ends of the binding-wire between them, and then by turning the two shafts simultaneously they are caused to twist the ends of the binding-wire together, and thus secure the band around the gavel of grain. These jaws are curved or hooked, so that, as one closes upon the other, the wire is gathered in toward their center of rotation; and in order to permit them to close near the center of rotation, the jaws are made of two parts, so that the hooked parts of one jaw can enter in between those of the other. In order that the jaws of this twister may be operated, the shaft of each is fitted with a pinion, N and N', and two cog-wheels, O O', are provided to engage with and turn the two pinions. The cog-wheels are of sufficient diameter to turn the pinions the number of revolutions required to twist the ends of the band by a single revolution of the cog-wheels. The cog-wheel O, appertaining to the jaws $x$ of the tubular shaft, is secured to a shaft, P, which is fitted with a crank, Q, by which it may be turned, so that the said shaft is the driving-shaft of the twister. The cog-wheel O', appertaining to the jaw $x'$ of the solid shaft, is fitted to turn loosely upon the driving-shaft P, and is connected with the other cog-wheel, O, by a coiled spring, $w$, which is inserted in a socket formed in the adjacent sides of the two cog-wheels, and has one end made fast to each cog-wheel. This spring tends to turn the loose cog-wheel O' in the proper direction to close the jaws of the twister by moving one jaw, $x'$, toward the other $x$. The distance to which it can turn the jaw is limited by a snug, $z$, which is secured to the cog-wheel O, and projects through a slot, $y$, in the loose cog-wheel O'. The loose cog-wheel is also provided with a snug, $z'$, which projects through a slot in the fast cog-wheel O. A sliding spring-stop, R, is supported by a suitable bearing upon the frame of the machine within the range of motion of the snug $z'$, a short angular distance in advance of the point at which the end of the slot in the fixed cog-wheel stops when the twisting of the wire band is completed, so that this stop catches the snug $z'$ of the loose cog-wheel and stops its movement, and consequently stops the turning of the corresponding jaw $x'$ before the fixed cog-wheel ceases to turn the other jaw, $x$. Hence the said other jaw turns away from the first jaw and opens to admit the ends of the band. In order to hold the jaws open until the ends of the band are carried between them, the lever H is pivoted to the frame of the machine behind the cog-wheel O, with its upper end in the proper position to pass beneath the snug $z$ of the fast cog-wheel O, when the jaws are opened and it is pressed toward the face of the cog-wheel by a spring, so that the cog-wheels are then held by the sliding stop R on one side and the lever H on the other. In order that the jaw of the twister may close upon the wire band when the gavel is properly surrounded by it, the sliding stop R is provided with a spur, $e'$, which projects into the case S of the latch-stops behind the lower latch-stop $i'$, so that when this stop is moved by the pin $s$ of the ring-carrier, the sliding stop R is moved by the pressure of the latch-stop $i'$ against its spur sufficiently to free the snug $z'$, and consequently the coiled spring $w$, within the socket in the cog-wheels O O', is permitted to turn the jaw $x'$, and cause it to close upon the ends of the band. When the sliding stop R is thus moved, there is nothing to prevent the turning of the cog-wheels O O' by the driving-shaft P; consequently it may then be turned to turn the twister and secure the band. The turning is continued until the snug $z$ again passes by the end of the stop-lever H, and the jaw $x$ has been opened by the contact of the snug $z'$ with the sliding stop R, which meanwhile has been returned to its proper place by its spring, whereby the secured band is let go by the twister, and the latter is placed in position to operate upon a new band. The upward movement of the snug $z$ causes the lever H to vibrate on its pivot, and the arm $d'$ of this lever is fitted with a hand, $c^1$, in the proper position to act upon a corresponding hand, $c^2$, projecting from the detent $k$ of the detachable strap-holder F; hence when the lever is vibrated by the snug $z$, just as the cog-wheels O O' are completing their revolution, the detent $k$ is moved to loose the compressing-strap from the gavel, the strap is then drawn off the gavel by the action of the spring in the strap-drum G, and the head of the strap is recaught by the next succeeding forked arm of the detachable strap-holder.

The spring of the sliding stop R is contained in a socket in its head, and operates upon a pin passing through its bearing, as represented in dotted lines at Fig. 4$^a$.

The opening of the forceps to receive the wire band looses the end already in it, so that, when the twister closes, that end, as well as the end cut by the shear-blades of the forceps, are both free for the twister to act upon them. The band is guided into the open twister by a shield-plate, T, on one side, and a fender, V, upon the other side, and it is compelled to pass in between these two by a movable driver, $m^4$. This driver consists of an oscillating bar, which is pivoted to the ring-carrier, and has a shank, $n'$, that bears against a stationary cam or rail, which is fixed to the frame of the cradle and extends around from the point $g^1$ to the point $g^2$, as represented in Fig. 3. The effect of this cam upon the shank of the driver is to cause the driver to project crosswise to the length of the band; hence, when the forceps upon the finger-stock and the driver rise together in approaching the twister, the extremities of the band are extended between them radially to the ring-carrier. These extremities are, therefore, compelled to enter the jaws of the twister, and are extended transversely to its jaws, while, at the same time, the inner incline side of the tongue $t^4$ of the shield-plate T co-operates with the driver and guides the extremities of the band together as the driver pushes them into its notch and between the tongue $t^4$ and the fender V, so that, when the jaws of the twister close, the extremities of the band are seized with certainty. On the other hand, as one end, $g^2$, of the cam extends but little beyond the point from which the driver starts when the ring-carrier is put in motion, the driver is permitted to turn backward parallel with the length of the band, so that it does not then interfere with the wire which is being drawn from between the sheaves $a'$ $a'$ by the forward movement of the ring-carrier, and the driver retains this backward position until the forceps in its forward movement has carried the end of the binding-wire about a third of a revolution, which brings the line of the wire in advance of the driver, so that the latter, when projected by the cam, extends behind the wire. The backward turning of the driver is insured by a projection, $s'$, on the back of the shield T, against which projection the edge of the driver is borne as it is moved forward.

The two sheaves $a'$ $a'$ form a guide for the binding material, so that it is delivered to the carrying and securing devices at the proper point. The supply of binding material is drawn from a spool or reel, U, which is situated near the band-securing devices. The spool is pivoted upon a swinging arbor, $f'$, at the end of a crank-arm, $h'$, whose shaft $r^1$ turns in a bearing, X, and this bearing is secured to the frame of the machine by means of a chair, W. The spool is so situated that the rim of one of its heads bears upon the rim of one of the guide-wheels $b^2$ of the ring-carrier, and is maintained there by the weight of the spool and binding material; hence, when the ring-carrier is turned, it causes the guide-wheel to turn by the frictional contact of the two rims, and the guide-wheel, in turning, tends to turn the spool by the frictional contact of its rim with that of the spool-head. The binding material is wound upon the spool in such a direction that such turning winds up the material, so that this mechanism not only resists the drawing off of the binding material from the spool, and thereby gives it tension, but also causes the spool to wind up any slack material which may be formed in the process of binding.

The force which the guide-wheel exerts upon the spool, and the strain or tension upon the binding material resulting from this force, will vary with the pressure of the spool against the guide-wheel. In order to adjust this pressure, and thereby adjust the tension of the binding material, the bearing X of the swinging crank is constructed to move along the chair W, to which it is secured, and the face of the chair is curved concentrically, or thereabout, with the spool, so that the crank-arm may be made to stand more or less erect by moving the bearing along the chair; consequently, a greater or less portion of the weight of the spool is permitted to bear upon the rim of the guide-wheel, thereby varying the pressure, while at the same time the curvature of the chair permits this change in the posture of the swinging crank-arm without changing materially the position of the spool relatively to the wheel which acts upon it. The bearing X is secured to the chair W by means of a screw-bolt, which passes through a hole in the bearing and a slot in the chair.

In the binding of grain it is expedient that the tension upon the binding material should be light when the material is being drawn off the spool, and consequently the pressure of the spool-head against the rim of the wheel that produces the tension by frictional contact must then be light. On the other hand, the pressure must be sufficiently great during the taking up of the slack of the binding material to draw it with the requisite tension around the gavel. This variation in the pressure during binding is effected, according to my invention, by moving the spool-head $q$ slightly from the rim of the wheel $b^2$, which resists its turning by frictional contact. To this end a lever, Y, is pivoted to the frame of the machine, with one of its arms, $w^1$, extending under a hub, $m^2$, upon the head of the spool $u$. The other arm of the lever is connected by a rod, $r^2$, with an upright lever, Z, whose upper end projects within the range of revolution of a cam or projection formed upon the rim of the ring-carrier B. The position and angular extent of this cam are such (as indicated by the dotted line extending from $t^1$ to $t^2$, in Fig. 3) that it acts, through the levers Z Y and rod $r$, to raise the spool slightly from the guide-wheel $b^2$ during about the first half of the revolution of the traveling forceps, thus relaxing the tension at that time, while it permits the spool to bear upon the guide-wheel during the remainder of the revolution of the ring-carrier. In practice, I find it expedient to relax the tension of the binding material just before the twister closes upon it; the forward end $t^1$ of the cam is therefore arranged to commence its action upon the lever Z at that time.

If the tension upon the binding material be wholly relaxed, as it would be substantially if the spool were raised so that its head did not press upon the rim of the guide-wheel $b^2$, and if the spool were then permitted to turn freely upon its arbor, the rapid revolution caused by the rapid withdrawal of binding material would generate sufficient momentum to cause the spool to continue to turn and run off material after the drawing off stopped, whereby a slack of material would be formed. In order to prevent such overrunning of the spool, the lever Y is arranged to act upon a hub, $m^2$, instead of upon the swinging arm $h^1$, so that the friction generated by the movement of the surface of this hub upon the arm $m^2$ resists the revolution of the spool sufficiently to neutralize its momentum, and prevent it from continuing to turn after the drawing off of material ceases.

It is desirable that the binding material should draw smoothly from the spool or reel, without jerking the spool or causing it to jump. This result is attained by arranging the sheaves $a'$ $a'$ (which constitute the guide by which the binding material passes from the spool to the traveling forceps) above the lower side of the spool-barrel, so that the direction in which the material is drawn from the spool is upward, and consequently the drawing off of the material tends in a slight degree to relax the pressure of the spool upon its friction mechanism, thereby causing it to deliver the material smoothly. The sheaves may, of course, be replaced by a guide of other form, such as a loop or eye, but I prefer the sheaves, because they make less friction on the material passing through them.

In the machine thus described one of the guide-wheels $b^2$ is the wheel against which the spool is pressed, but as the guide-wheel is caused to turn by the revolution of the ring-carrier, the latter is the instrumentality which controls the spool, and the guide-wheel merely transmits the power from the ring-carrier to the spool. I, therefore, sometimes apply the spool-head directly to the ring-carrier and then wind the binding material in the proper direction upon the spool to be wound up by the forward movement of the ring-carrier. In practice, I find it expedient to form the rim of the spool-head which bears against the wheel that produces the frictional contact of wood covered with leather, and I find that these combinations of mechanism for winding up the slack binding material, adjusting its tension, and slacking the tension during the drawing off of binding material, are adapted as well for cord as for wire binding material. I also declare that, although I have in this machine described a twister for the purpose of securing the ends of the band, my invention is not restricted to the employment of that instrument in all of my combinations; because in some of them it does not enter as a member, while in others a band-securing device adapted to securing the ends of a cord band by tying, or otherwise, may be substituted in place of the twister when the invention is to be used in binding-machines using cord as the binding material; and as several such devices are known at the present day, I do not deem it necessary to describe the m A seat, $A^3$, for the operator is secured to the binding apparatus in a convenient position for him to apply his left hand to the crank-handle by which the ring-carrier is operated, and his right hand to the crank-handle by which the shaft which drives the twister is operated.

Having thus described a binding apparatus embodying all my improvements, what I claim as my invention, and desire to secure by Letters Patent, is—

1. The combination, in a binder, of the drum and arbor of the compressing-strap with a ratchet-wheel and pawl, substantially as set forth.

2. The combination, in a binder, of the ring-carrier with shear-blades for cutting the binding material.

3. The combination, in a binder, of the traveling fingers or forceps for griping the end of the binding material with shear-blades for cutting it, substantially as set forth.

4. The combination, in a binder, of the traveling-fingers or forceps, and the instrument for carrying them around the gavel, with a stationary projection in the track of the binding material for retaining it in its proper place, substantially as set forth.

5. The combination, in a binder, of the traveling forceps with a stationary inclined block for operating it, substantially as set forth.

6. The combination, in a binder, of the traveling forceps with a heel extending across the opening between the jaws, substantially as set forth.

7. The combination, in a binder, of the jaws of the traveling forceps with a guard, substantially as set forth.

8. The twister, with radial jaws projecting from concentric shafts, constructed and operating substantially as set forth.

9. The twister, with radial and hooked jaws projecting from concentric shafts, constructed and operating substantially as set forth.

10. The combination of the twister with its driving-shaft by means of pinions and cog-wheels and the spring-connection, substantially as set forth.

11. The combination, in a binder, of the traveling forceps with a movable driver for the band, substantially as set forth.

12. The combination, in a binder, of the movable driver for the band with a ring-carrier for carrying it around the gavel, substantially as set forth.

13. The combination, in a binder, of the traveling forceps and movable driver with a directing instrument to guide the two extremities of the band together, substantially as set forth.

14. The combination, in a binder, of the spool or reel of the binding material with the ring-carrier by frictional contact, substantially as set forth.

15. The combination, in a binder, of the swinging arm of the spool of the binding material with a movable bearing, and with a curved chair for said bearing, substantially as set forth.

16. The combination, in a binder, of the ring-carrier and spool of the binding material with mechanism for moving said spool slightly from the wheel that is in friction-contact with it, substantially as set forth.

17. The arrangement, in a binder, of the spool of the binding material and the mechanism for relieving its pressure upon the instrument that resists its turning by friction, in such manner that the turning of the spool when the pressure is relieved is sufficiently resisted by friction to neutralize the movement of the spool, substantially as set forth.

18. The arrangement of guide for the binding material, spool, and friction tension mechanism, in such manner that the drawing of the material through the guide tends to move the spool from the friction tension mechanism, substantially as set forth.

In testimony whereof I have hereunto subscribed my name this 23d day of October, A. D. 1865.

SOLOMON T. HOLLY.

Witnesses:
E. S. RENWICK,
W. L. BENNEM.